J. D. KARLE.
LOCKING DEVICE.
APPLICATION FILED APR. 21, 1920.
1,418,379.
Patented June 6, 1922.
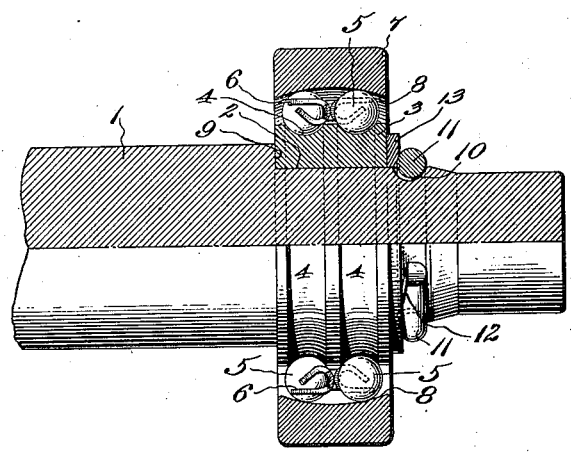
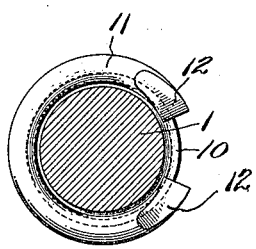
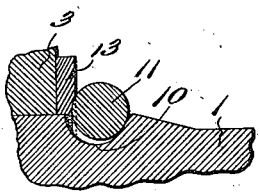
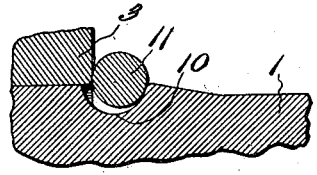
INVENTOR
John D. Karle
BY
ATTORNEY

UNITED STATES PATENT OFFICE.

JOHN D. KARLE, OF ROSELLE PARK, NEW JERSEY, ASSIGNOR TO DIEHL MANUFACTURING COMPANY, OF ELIZABETH, NEW JERSEY, A CORPORATION OF NEW JERSEY.

LOCKING DEVICE.

1,418,379.          Specification of Letters Patent.          Patented June 6, 1922.

Application filed April 21, 1920. Serial No. 375,494.

*To all whom it may concern:*

Be it known that I, JOHN D. KARLE, a citizen of the United States, residing at Roselle Park, in the county of Union and State of New Jersey, have invented certain new and useful Improvements in Locking Devices, of which the following is a specification, reference being had therein to the accompanying drawings.

This invention relates to means for securing ball-bearings or similar devices to shafts, but is by no means limited to such use as it may be used where it is desired to secure a collar, ring, or other member on a shaft against a shoulder or other suitable stop on the shaft, or may be used to secure a ring or disk element within the cylindrical bore of another element.

An object of the invention is to provide a securing or locking means for such elements, which will be simple and easy to apply and remove, which will be easy and cheap to manufacture, and which will require a small space and yet will be strong and efficient.

Another object is to provide a lock or securing means of this character which will not become loose in operation.

In its preferred embodiment the invention comprises a shaft provided with any suitable stop preferably obtained by reducing the shaft to form a shoulder. In the form shown the reduced portion of the shaft is adapted to receive the inner bearing ring. In the shaft adjacent the end of the ring spaced from the stop or shoulder is formed an abutment, preferably an annular groove substantially semi-circular in cross-section. In this groove is mounted a resilient locking ring which is made expansible and contractible in both maximum and minimum diameters, preferably by being split, and is preferably of substantially circular cross section. The spacing of the groove from the end of the bearing ring is such that the locking ring does not become fully seated in the bottom of the groove but has a cam action against the outer side wall of the same so as to maintain because of its resilience a constant pressure against the bearing ring to hold it firmly against the shoulder or stop on the shaft, and to insure against its working loose under continued operation.

Referring to the accompanying drawings, Fig. 1 is a partial sectional elevation of a ball-bearing including my invention. Fig. 2 is a cross-section through the shaft adjacent the locking element. Fig. 3 is a detail sectional view of the locking means. Fig. 4 is a view similar to Fig. 3 showing a slight modification.

My invention relates to means for locking ball-bearings or similar devices upon a shaft. In the embodiment shown the shaft 1 is reduced at 2 to receive the inner bearing ring 3 which is provided with the parallel annular grooves 4 forming raceways for the series of bearing balls 5 secured in proper relation by means of the spacing ring or separator 6. The balls are surrounded by a bearing ring 7 which is formed on its inner face with a portion of a spherical surface 8 providing a bearing or raceway for the anti-friction balls 5 and enables the ring 7 to tilt relative to the bearing ring 3 in a well known manner.

The reduction of the shaft 1 at 2 forms a shoulder 9 against which one end of the internal bearing ring 3 abuts. Suitably spaced from the shoulder 9 adjacent the opposite end of the bearing ring 3 the shaft is provided with an abutment preferably afforded by the inwardly inclined outer wall of an annular grooove 10 formed substantially semi-cicular in cross section. Mounted in this annular groove 10 is a resilient ring 11 which is preferably split and of circular cross section and which is preferably provided at the ends adjacent the split with tapering portions 12 which allow for the insertion of a suitable tool to facilitate the removal of this ring from the groove. The spacing of the groove 10 from the end of the bearing 3 is such that the split locking ring 11 does not become fully seated upon the bottom of the groove but comes against one wall thereof due to its resiliency and therefore presses against the end of the bearing 3 and retains it firmly against the shoulder 9. This insures against the bearing 3 working loose under continued operation.

If desired the spacing of the groove 10 may be such as to allow for the insertion of a washer 13 between the ring 11 and the end of the bearing 3. This washer 13 is preferably made of lead or some other soft material in which the ring 11 is embedded slightly under pressure. This allows continuous bearing for the ring 11 throughout its entire length. It also facilitates manufacture because when it is employed less accurate machining of the parts is necessary.

It will be noted that the elemental points of the locking ring move, during expansion or contraction of the ring, in parallel planes at right angles to the axis of the shaft 1 and at all times exert pressure against the end of the bearing 3 and that the ring thereby retains it tightly against the shoulder 9. It, however, occupies little space lengthwise of the shaft but may be readily removed by inserting a suitable tool and prying against the inclined surface 12 if it is desired to remove the bearing from the shaft. In replacing the bearing it is as readily locked in position by merely forcing the locking ring 11 over the edge of the groove 10 as will be apparent.

This invention is, however, of general application and obviously is not limited to use with a ball-bearing but may be used anywhere a locking device of this character is desirable.

Having thus set forth the nature of the invention, what I claim herein is—

1. In combination, a shaft provided with a stop and an abutment, an element mounted on the shaft between said stop and abutment, and a resilient ring contractible and expansible both in outside and inside diameter and having camming action against said abutment to urge said element against the resistance of said stop.

2. In combination, a shaft provided with a stop and an abutment, an element mounted on the shaft between said stop and abutment, and a resilient ring having a camming action against said abutment tending to force the ring endwise of the shaft and against said member, the elemental portions of the ring in engagement with said abutment tending to move in parallel planes normal to the axis of said shaft under the contractile effort of the ring.

3. In combination, a shaft provided with a stop and a groove, an element mounted on said shaft between said stop and groove, and a resilient contractible and expansible ring in engagement with said element and having a camming action against the outer wall of said groove, said ring being held out of engagement with the bottom and inner wall of the groove by the reactionary pressure of said element and stop.

4. In combination a shaft provided with stop means, a member mounted on the shaft, means for retaining said member against the stop means comprising a groove and a split resilient ring having camming action against the walls of the groove.

5. In combination a shaft provided with stop means, a member mounted on the shaft, means for retaining said member against the action of the stop means comprising an abutment and a resilient split ring having camming action against the abutment.

6. A mounting for a ball-bearing comprising a shaft provided with an annular groove, a bearing ring mounted on the shaft, and means for locking the ring on the shaft comprising a split resilient ring adapted to be mounted in the groove and cam against a wall thereof.

7. A mounting for a ball-bearing comprising a shaft having stop means thereon and also provided with an annular groove, a bearing ring mounted on the shaft, and means for locking the bearing ring against the stop means comprising a split resilient ring mounted in the groove and having a camming action against the walls thereof.

8. In combination a shaft provided with a stop means and having an annular groove, a member mounted on the shaft, and means for locking the member against the stop means, comprising a split resilient ring mounted in the groove, and having camming action against the walls thereof and a ring of soft metal between the resilient ring and the member.

9. In combination a shaft provided with stop-means, a member mounted on the shaft, means for retaining said member against the stop-means comprising an abutment, a resilient split ring having camming action against the abutment, and a washer of soft metal between the ring and the member.

10. In combination a shaft provided with a stop means, a ball-bearing mounted on the shaft having one of its ball-race members confined thereon against the stop means, and means for locking the member in position comprising an annular groove in the shaft and a split resilient ring in the groove.

In testimony whereof, I have signed my name to this specification.

JOHN D. KARLE.